(12) United States Patent
Bollin

(10) Patent No.: US 12,365,464 B2
(45) Date of Patent: Jul. 22, 2025

(54) GALLEY FOR AIRCRAFT COMPRISING A TROLLEY LOCKING SYSTEM

(71) Applicant: Airbus (S.A.S.), Blagnac (FR)

(72) Inventor: Thomas Bollin, Blagnac (FR)

(73) Assignee: Airbus (S.A.S.), Blagnac (FR)

( * ) Notice: Subject to any disclaimer, the term of this patent is extended or adjusted under 35 U.S.C. 154(b) by 53 days.

(21) Appl. No.: 18/590,097

(22) Filed: Feb. 28, 2024

(65) Prior Publication Data

US 2024/0300650 A1     Sep. 12, 2024

(30) Foreign Application Priority Data

Mar. 6, 2023   (FR) ........................... 2302048

(51) Int. Cl.
    *B64D 11/04*     (2006.01)

(52) U.S. Cl.
    CPC ..................... *B64D 11/04* (2013.01)

(58) Field of Classification Search
    CPC .... B64D 11/01; B64D 11/0007; B64D 9/003; B62B 5/049; B62B 2202/67; E05B 558/00; E05B 558/57
    USPC .......................................................... 292/35
    See application file for complete search history.

(56) References Cited

U.S. PATENT DOCUMENTS

| | | | | |
|---|---|---|---|---|
| 5,322,244 A * | 6/1994 | Dallmann | .......... | B64D 11/0007 244/118.1 |
| 10,124,896 B2 * | 11/2018 | Sieben | ................... | B64D 11/04 |
| 10,513,338 B2 * | 12/2019 | Weifenbach | ........... | B64D 11/04 |
| 10,569,796 B2 * | 2/2020 | Gonnsen | ............. | B64D 11/0007 |
| 10,569,880 B2 * | 2/2020 | Heidtmann | ........ | B64D 11/0007 |
| 10,577,108 B2 * | 3/2020 | Gonnsen | ................ | B64D 11/04 |
| 11,235,879 B2 * | 2/2022 | Elshaw | ...................... | B64F 5/00 |
| 11,518,518 B2 * | 12/2022 | Bauer | ..................... | B64D 11/04 |
| 11,548,639 B2 * | 1/2023 | Bauer | ....................... | B60R 7/02 |
| 2010/0155391 A1 * | 6/2010 | Koschberg | .............. | F24C 15/16 219/391 |
| 2013/0206905 A1 * | 8/2013 | Savian | ................... | B64D 11/04 29/428 |
| 2016/0290023 A1 * | 10/2016 | Boivin | ................. | B62B 5/0433 |
| 2017/0166310 A1 * | 6/2017 | Wallbott | .................... | B25J 1/04 |
| 2018/0016011 A1 * | 1/2018 | Burd | ..................... | B64D 13/06 |
| 2018/0016013 A1 * | 1/2018 | Burd | ...................... | B64D 9/003 |
| 2018/0273157 A1 * | 9/2018 | Hoogeveen | ............. | E06B 3/482 |
| 2019/0204004 A1 * | 7/2019 | Gienke | .................. | B64D 13/08 |
| 2019/0210729 A1 * | 7/2019 | Riedel | ...................... | B64G 1/60 |

(Continued)

OTHER PUBLICATIONS

French Search Report for Application No. 2302048 dated Sep. 15, 2023.

*Primary Examiner* — Nathan Cumar
(74) *Attorney, Agent, or Firm* — KDW Firm PLLC

(57) ABSTRACT

A galley for an aircraft, including a compartment, which has a doorframe and an end wall, for receiving two trolleys, and a locking system which includes a rod that can be rotated and actuated by a handle, a slider which is free in translation on the rod and is locked in rotation relative to the rod, and a separator which is attached to the slider and is designed to occupy alternatively a retracted position in which it is intended to be raised above the trolleys, and a locking position in which it is intended to extend vertically in contact with a wall of one of the trolleys. With such an arrangement, the position of the separator can be modified according to the length of the trolleys.

9 Claims, 4 Drawing Sheets

(56) References Cited

U.S. PATENT DOCUMENTS

| | | | |
|---|---|---|---|
| 2019/0308727 A1* | 10/2019 | Riedel | B64D 11/04 |
| 2019/0308729 A1* | 10/2019 | Riedel | B64D 11/04 |
| 2019/0311318 A1* | 10/2019 | Bauer | B65G 1/0492 |
| 2020/0002002 A1* | 1/2020 | Bauer | B64D 11/0015 |
| 2020/0181942 A1* | 6/2020 | Bauer | E05B 41/00 |
| 2021/0047042 A1* | 2/2021 | Tracey | B64D 11/0007 |
| 2021/0379432 A1* | 12/2021 | Muin | B64D 11/0007 |
| 2022/0063811 A1* | 3/2022 | Keskin | E05C 5/00 |
| 2022/0105975 A1* | 4/2022 | Dowty | B64D 11/04 |
| 2022/0127001 A1* | 4/2022 | Chylinski | B64D 11/04 |
| 2022/0186535 A1* | 6/2022 | Keskin | E05C 1/004 |
| 2022/0234741 A1* | 7/2022 | Agadi | B64D 11/04 |
| 2022/0380052 A1* | 12/2022 | Barmichev | B64D 11/0007 |

* cited by examiner

GALLEY FOR AIRCRAFT COMPRISING A TROLLEY LOCKING SYSTEM

TECHNICAL FIELD

The disclosure herein relates to a galley for an aircraft, wherein the galley is intended to receive two trolleys and comprises a locking system for locking one of the trolleys when the other is absent. The disclosure herein also relates to an aircraft comprising at least one such galley.

BACKGROUND

An aircraft conventionally comprises at least one galley having various components which, inter alia, allow the members of the crew to prepare meal trays for the passengers. Each meal tray is conventionally stored in a trolley.

In order to stow the trolleys, the galley comprises a panel under which a compartment is formed, into which the two trolleys can be pushed one after the other. The trolleys thus do not obstruct the aisles of the aircraft. The compartment forms a housing, in the space of which the trolleys are accommodated, the housing having an access and being equipped with a door allowing the access to be shut.

The compartment is dimensioned in terms of depth in order to make it possible to accommodate two trolleys which do not have the same length. Provision is thus made to accommodate a so-called "long" trolley and a so-called "short" trolley which has a shorter length, approximately halved in relation to the long trolley. The long trolley is thus introduced first into the compartment under the panel, and the short trolley is subsequently introduced into the same compartment, which is then closed by the door. The depth of the compartment is determined so that the two trolleys can be accommodated therein one against the other, with the door closed and without a lengthwise clearance. The depth is thus in total equal to the sum of the lengths of the trolleys.

It may happen that only one trolley is present in the compartment. It is then necessary to lock it in order to prevent it from moving along the compartment. To this end, it is known to use a separator which is mounted so that it can be rotated under the panel about an axis which is horizontal and parallel to the depth of the compartment. The separator is movable between a retracted position in which it is arranged horizontally above the trolleys, and a locking position in which it extends vertically in the compartment. This separator can be displaced using a handle arranged above the door of the compartment.

The separator is arranged along the depth of the compartment so as to bear against the wall of the long trolley when the latter is the only trolley in the compartment, although it cannot be deployed when only the short trolley is placed in the compartment because it catches on the top of the short trolley, or if the separator is deployed the short trolley then protrudes from the entry of the compartment and prevents the door from being closed.

It is therefore necessary to find a different arrangement which holds the short trolley in place when it is the only trolley there.

SUMMARY

It is an object of the disclosure herein to provide a galley for an aircraft, wherein the galley makes it possible to accommodate two trolleys and has a locking system comprising a separator, the position of which can be adapted according to the length of the trolleys.

To this end, a galley for an aircraft is provided, the galley comprising:
- a panel,
- under the panel, a compartment which has a doorframe and an end wall and is intended to receive two trolleys by introduction through the doorframe along a direction of introduction,
- a door, which is hinged to the doorframe alternatively between an open position and a closed position, and
- a locking system, which comprises:
  - a rod which is mounted so that it can be rotated about an axis of rotation parallel to the direction of introduction,
  - a handle which is attached to the rod and is designed to rotate the rod,
  - a slider which is mounted freely in translation on the rod and is locked in rotation relative to the rod, and
  - a separator which is attached to the slider and is designed to occupy alternatively a retracted position in which it is intended to be raised above the trolleys, and a locking position in which it is intended to extend vertically in contact with a wall of one of the trolleys.

With such an arrangement, the position of the separator can be modified according to the length of the trolleys.

Advantageously, the rod is supported by two extensions which protrude downwards from the panel.

Advantageously, the locking system comprises two stops, which are fixed on the rod and are arranged on either side of the slider.

Advantageously, a first stop is arranged between the slider and the doorframe in order to lock the slider in translation in the direction of the doorframe.

Advantageously, a second stop is arranged between the slider and the end wall in order to lock the slider in translation in the direction of the end wall.

Advantageously, the locking system comprises a restoring element, which is arranged so as to press the slider back against the first stop when it is separated from the latter.

Advantageously, the restoring element is a compression spring arranged between the slider and the second stop.

Advantageously, each stop is a ring fitted tightly onto the rod.

The disclosure herein also provides an aircraft comprising a fuselage in which at least one galley according to one of the above variants as well as a long trolley and a short trolley are installed.

BRIEF DESCRIPTION OF THE DRAWINGS

The abovementioned characteristics of the disclosure herein, as well as others, will become clearer on reading the following description of an exemplary embodiment, the description being given with reference to the appended drawings, in which.

DETAILED DESCRIPTION

Figure 1:
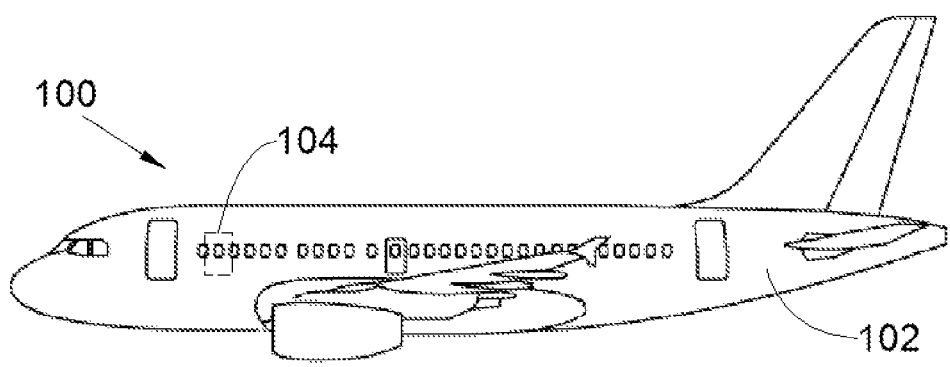
FIG. 1 is a side view of an aircraft according to the disclosure herein.

FIG. 1 shows an aircraft 100 which comprises a fuselage 102, inside which at least one galley 104 according to the disclosure herein is accommodated. In the embodiment of the disclosure herein proposed in FIG. 1, there is only one galley 104 at the front of the fuselage 102, which has a floor 50, although there may be a plurality of such galleys distributed over the length of the fuselage 102.

In the rest of the description, the term "horizontal" and the term "vertical" are defined in relation to the aircraft 100 when it is on the ground, that is to say the floor 50 is horizontal.

Figure 2:
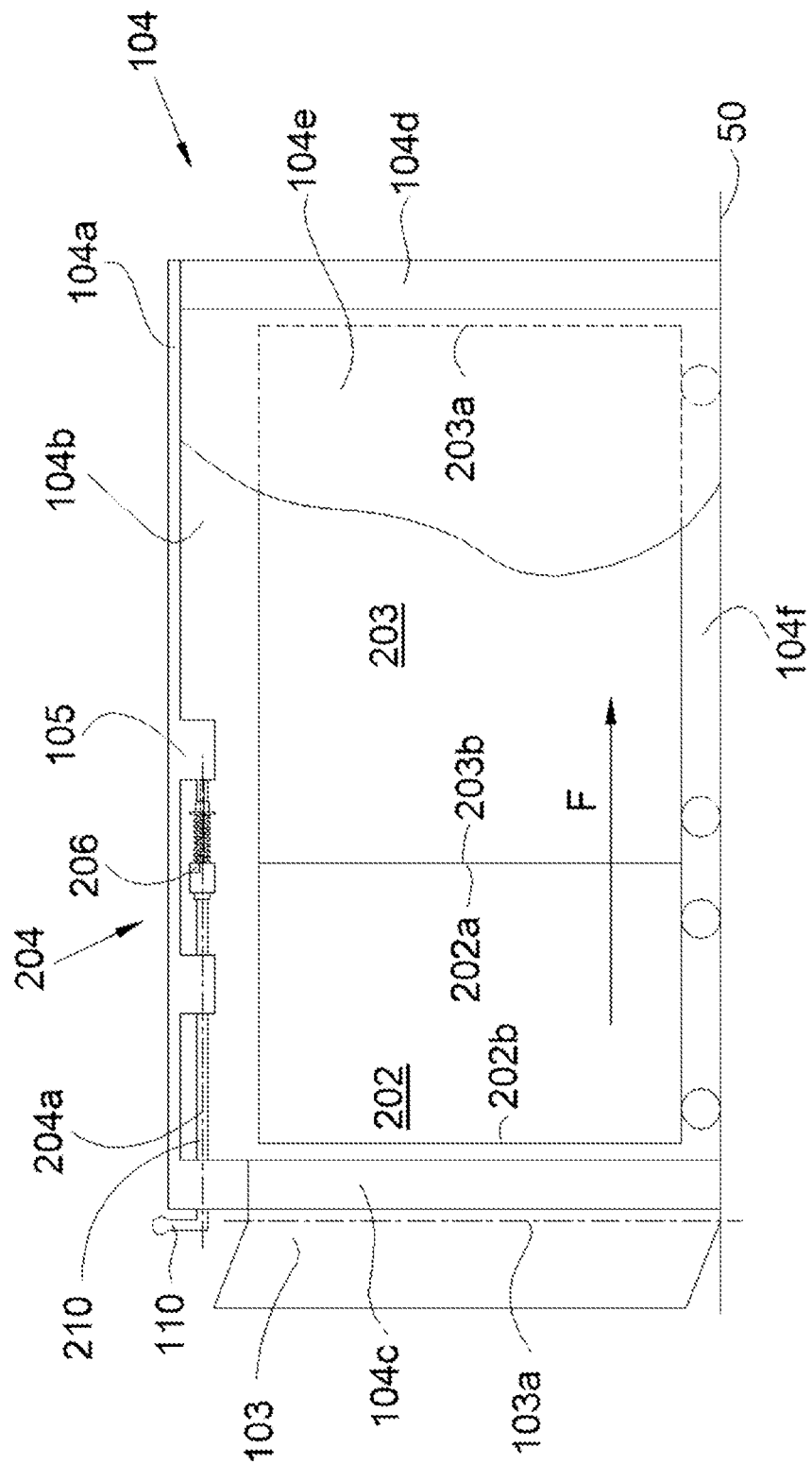
FIG. 2 is a side view of a galley according to the disclosure herein.

FIG. 2 shows a galley 104 which rests on the floor 50 of the fuselage 102 and which comprises a horizontal panel 104a above the floor 50, under which a compartment 104b is formed, the latter making it possible to accommodate two trolleys 202 and 203 mounted on wheels, namely a long trolley 203 and a short trolley 202, which has a shorter length than the long trolley 203. In the form illustrated, the short trolley 202 has a length which is halved in relation to the length of the long trolley 203.

The compartment 104b has the form of a housing, in the space of which the trolleys 202 and 203 are accommodated.

One of the ends of the compartment 104b is open and forms a doorframe 104c for a door 103, and the other end of the compartment 104b is closed and constitutes the end wall 104d of the compartment 104b. The doorframe 104c makes it possible to introduce the trolleys 202 and 203 into the compartment 104b, one behind the other in the direction of their length. The vertical planes which contain the doorframe 104c and the end wall 104d are parallel.

The galley 104 also has a door 103, which is hinged to the doorframe 104c and can alternatively occupy an open position in which the trolleys 202 and 203 can pass through the doorframe 104c in order to be introduced into the interior of the compartment 104b, and a closed position in which the trolleys 202 and 203 cannot pass through. The door 103 is mounted movably about a hinge axis 103a which is vertical, that is to say perpendicular to the floor 50.

The direction of introduction of the trolleys 202 and 203 into the compartment 104b is horizontal, that is to say parallel to the floor 50 and perpendicular to the end wall 104d, and is represented by the arrow F. The direction of removal is of course oriented in the opposite direction to the arrow F. The depth of the compartment 104b parallel to the direction of introduction F is such that it allows introduction of the long trolley 203 and the short trolley 202 and makes it possible to close the door 103 while ensuring a minimal clearance of the trolleys 202 and 203 in the compartment 104b. The depth of the compartment 104b is thus in total equal to the sum of the lengths of the trolleys 202 and 203.

The compartment 104b is thus delimited above the floor 50 by the panel 104a, by the doorframe 104c and by the end wall 104d and by the two parallel side walls 104e-f which extend vertically, that is to say perpendicularly to the floor 50, between the doorframe 104c and the end wall 104d. The wall denoted by 104e is represented in a partially cutaway view, and the wall denoted by 104f lies behind the trolleys 202 and 203 in FIG. 2.

Each trolley 202, 203 has a front wall 202a, 203a, which is the wall that enters the compartment 104b first, and a rear wall 202b, 203b, which is the wall that emerges from the compartment 104b first.

Thus, when the long trolley 203 is introduced first through the doorframe 104c, its front wall 203a comes to bear against the end wall 104d, then when the short trolley 202 is introduced second through the doorframe 104c, its front wall 202a comes to bear against the rear wall 203b of the long trolley 203 and its real wall 202b bears against the door 103 when the latter is closed. The two trolleys 202 and 203 are thus secured in the compartment 104b.

The galley 104 comprises a locking system 204, which is mounted under the panel 104a in the compartment 104b.

The locking system 204 comprises a rod 210, which is mounted so that it can be rotated about an axis of rotation 204a parallel to the direction of introduction F. The rod 210 is in this case supported by two extensions 105 which protrude downwards, that is to say towards the floor 50, from the panel 104a and are attached to the latter. The rod 210 thus extends through each extension 105 in a bore which each extension 105 has for this purpose.

The locking system 204 comprises a handle 110, which is attached to the rod 210 and is accessible from outside the compartment 104b, in this case above the doorframe 104c. The handle can thus be operated so as to rotate the rod 210 about the axis of rotation 204a.

The locking system 204 comprises a slider 208, which is mounted freely in translation on the rod 210. The slider 208 is in this case arranged between the two extensions 105. The slider 208 is also locked in rotation relative to the rod 210. Thus, any rotation of the rod 210 leads to the same rotation of the slider 208. The slider 208 and the rod 210 are thus linked by a purely sliding linkage.

Figure 5:
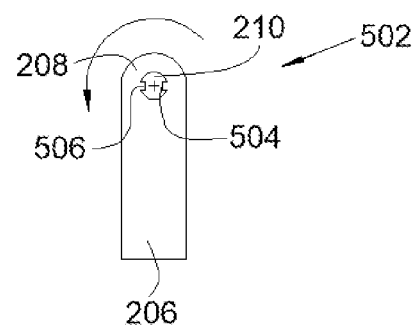
FIG. 5 is a view in section of the locking system along the line V-V of FIG. 4.

In the embodiment of the disclosure herein presented in FIG. 5, the locking of the slider 208 in rotation is ensured by at least one groove 504, which is formed in the rod 210, parallel to the direction of introduction F, and for each groove 504, a lug 506 which is attached to the slider 208, the lug 506 being inserted into the groove 504.

The locking system 204 also comprises a separator 206, which is attached to the slider 208. When the rod 210 is rotated by the handle 110, the slider 208 follows the same movement as the separator 206, which can thus alternatively occupy a retracted position in which it is raised above the trolleys 202, 203, and a locking position in which it extends vertically downwards in order to come in contact with a wall of one of the trolleys 202, 203, as explained below.

Figure 3:
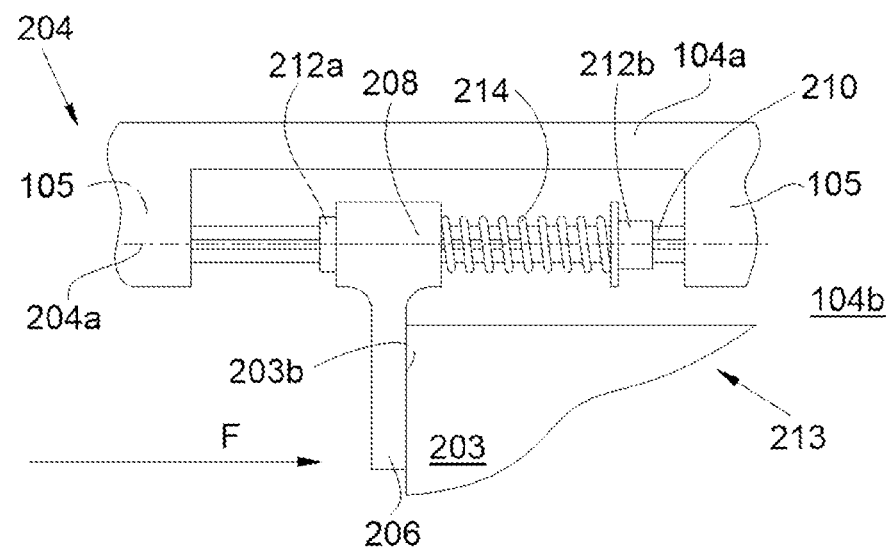
FIG. 3 is an enlargement of a locking system used in the galley according to the disclosure herein, in a first position of use.
Figure 4:
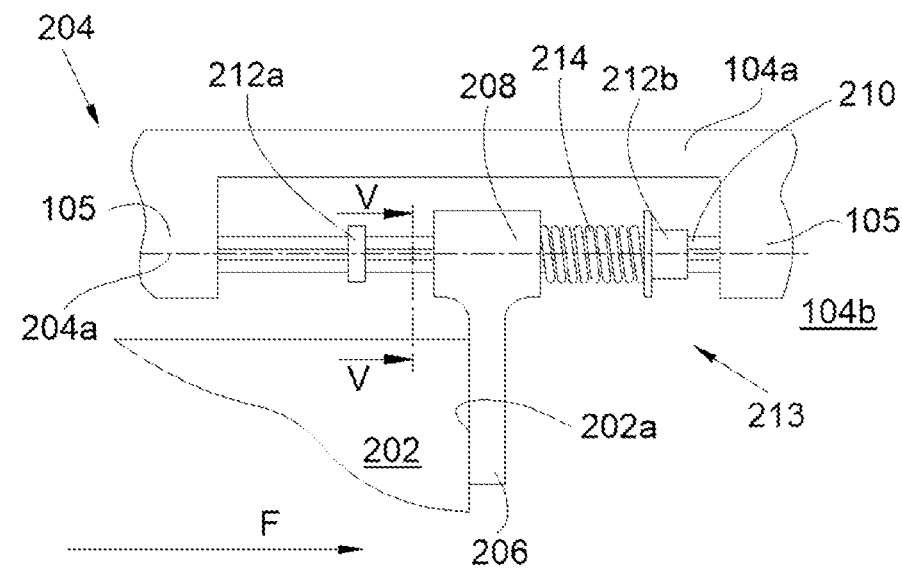
FIG. 4 is an enlargement of a locking system used in the galley according to the disclosure herein, in a second position of use.

FIG. 2 shows the separator 206 in the retracted position, and FIGS. 3 and 4 show the separator 206 in the locking position. The rotation of the separator 206 represented by the arrow of FIG. 5, in order to change from the retracted position to the locking position, may take place in the opposite sense, depending on the way in which the various elements constituting the galley 104 are installed.

The free displacement in translation of the slider 208, and therefore the separator 206, thus makes it possible to lock the only trolley 202, 203 present in the compartment 104b regardless of the length of the trolley 202, 203. The translation which is possible for the separator 206 allows its position to be adapted to the length of the only trolley 202, 203 present.

FIG. 3 shows the galley 104 with only the long trolley 203 seen partially, and FIG. 4 shows the galley 104 with only the short trolley 202 seen partially. As may be noted in these two figures, the slider 208, and therefore the separator 206, are displaced parallel to the direction of the introduction F in order to come in contact respectively with the front face 202a of the short trolley 202, when it is the only trolley, or the rear face 203b of the long trolley 203, when it is the only trolley.

Thus, in a first position (FIG. 3), the separator 206 is positioned so as bear against the rear face 203b of the long trolley 203 and the long trolley 203 is thus restrained between the end wall 104d and the separator 206. In a second position (FIG. 4), the separator 206 has been displaced and is positioned so as to bear against the front face 202a of the short trolley 202 and the short trolley 202 is thus restrained between the separator 206 and the door 103. Each trolley 202, 203 is therefore held in position.

In the embodiment of the disclosure herein which is presented here, the slider 208 is limited in its translational displacements between two extreme positions, which take into account the various possible lengths for the trolleys 202 and 203 and are the positions beyond which the slider 208 cannot pass. In the embodiment of the disclosure herein which is presented in FIGS. 3 and 4, the extreme positions could be defined by the inner walls of the extensions 105, which face towards the separator 206 and form an abutment.

In the embodiment of the disclosure herein which is presented in FIGS. 3 and 4, the locking system 204 has two stops 212a-b, which are fixed on the rod 210 and are arranged on either side of the slider 208 in order to limit the displacement of the slider 208 to between the extreme positions, which are then determined by the two stops 212a-b. The first stop 212a is thus arranged between the slider 208 and the doorframe 104c in order to lock the slider in translation in the direction of the doorframe 104c, and the second stop 212b is thus arranged between the slider 208 and the end wall 104d in order to lock the slider in translation in the direction of the end wall 104d.

Each stop 212a-b in this case has the form of a ring 212a-b, which is fitted tightly onto the rod 210. The fit between the ring 212 and the rod 210 is such that displacement of the ring 212 requires a force greater than the pressure which the slider 208 can exert, in particular when a restoring element is used as described below.

The position of the first stop 212a, which is on the side nearer the doorframe 104c, is determined in such a way that when the slider 208 is locked by the first stop 212a, it is in a position corresponding to the maximum length which the long trolley 203 can have and, in relation to this first stop 212a, the slider 208 can be displaced only on the opposite side, that is to say towards the end wall 104d of the compartment 104b.

The position of the second stop 212b, which is on the side nearer the end wall 104d, is determined in such a way that when the slider 208 is locked by the second stop 212b, it is in a position corresponding to the maximum length which the short trolley 202 can have and, in relation to this second stop 212b, the slider 208 can be displaced only on the opposite side, that is to say towards the doorframe 104c.

Thus, depending on the type of trolley 202, 203 put into the compartment 104b, the positions of the slider 208 and therefore of the separator 206 can be adjusted in order to bear against the front wall 202a of the short trolley 202 or the rear wall 203b of the long trolley 203.

In the embodiment of the disclosure herein which is presented in FIGS. 3 and 4, the locking system 204 also comprises a restoring element 213, in this case a compression spring 214, which is arranged between the slider 208 and the second stop 212b. The extreme position corresponding to the second stop 212b, which is reached by the slider 208, corresponds in this case to the position reached when the compression spring 214 is compressed by the slider 208 under the effect of the short trolley 202.

The compression spring 214 presses the slider 208 back against the first stop 212a when the slider 208 is separated from the first stop 212a. The compression spring 214 is in this case fitted onto the rod 210. As and when required, it may be necessary to raise the separator 206. For this purpose, the locking system 204 comprises the handle 110 attached to the rod 210, which is mounted so that it can be rotated about its axis, the handle making it possible to pivot the rod 210 about its axis.

Thus, rotating the handle 110 causes pivoting of the rod 210, and consequently of the separator 206, which is then raised above the trolleys.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A galley for an aircraft, the galley comprising:
   a panel;
   under the panel, a compartment which has a doorframe and an end wall and is configured to receive two trolleys by introduction through the doorframe along a direction of introduction;
   a door which is hinged to the doorframe alternatively between an open position and a closed position; and
   a locking system comprising:
      a rod mounted to rotate about an axis of rotation parallel to the direction of introduction;
      a handle attached to the rod to rotate the rod;
      a slider mounted freely in translation on the rod and locked in rotation relative to the rod; and
      a separator attached to the slider to occupy alternatively a retracted position in which it is raised above the trolleys, and a locking position in which it extends vertically in contact with a wall of one of the trolleys.

2. The galley according to claim 1, wherein the rod is supported by two extensions which protrude downwards from the panel.

3. The galley according to claim 1, wherein the locking system comprises two stops, which are fixed on the rod and are on either side of the slider.

4. The galley according to claim 3, wherein a first stop is between the slider and the doorframe to lock the slider in translation in a direction of the doorframe.

5. The galley according to claim 3, wherein a second stop is between the slider and the end wall to lock the slider in translation in a direction of the end wall.

6. The galley according to claim 4, wherein the locking system comprises a restoring element to press the slider back against the first stop when it is separated from the first stop.

7. The galley according to claim 6, wherein the restoring element is a compression spring between the slider and the second stop.

8. The galley according to claim 3, wherein each stop is a ring fitted tightly onto the rod.

9. An aircraft comprising a fuselage in which at least one galley according to claim 1 as well as a long trolley and a short trolley are installed.

* * * * *